United States Patent
Kishimoto

(10) Patent No.: US 12,147,518 B2
(45) Date of Patent: Nov. 19, 2024

(54) SYSTEM AND AUTHENTICATION DEVICE

(71) Applicant: KABUSHIKI KAISHA TOKAI RIKA DENKI SEISAKUSHO, Aichi (JP)

(72) Inventor: Kohei Kishimoto, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 304 days.

(21) Appl. No.: 17/914,566

(22) PCT Filed: Feb. 1, 2021

(86) PCT No.: PCT/JP2021/003574
§ 371 (c)(1),
(2) Date: Sep. 26, 2022

(87) PCT Pub. No.: WO2021/250930
PCT Pub. Date: Dec. 16, 2021

(65) Prior Publication Data
US 2023/0205856 A1   Jun. 29, 2023

(30) Foreign Application Priority Data

Jun. 10, 2020   (JP) .................... 2020-100574

(51) Int. Cl.
G06F 21/32   (2013.01)
H04L 9/32   (2006.01)

(52) U.S. Cl.
CPC ............ G06F 21/32 (2013.01); H04L 9/3242 (2013.01)

(58) Field of Classification Search
CPC ........ G06F 21/32; G06F 21/33; H04L 9/3242; H04L 9/0861; H04L 2209/84; H04L 9/3231; H04L 9/3247; G09C 1/00
See application file for complete search history.

(56) References Cited

U.S. PATENT DOCUMENTS

| | | | |
|---|---|---|---|
| 2008/0215890 A1* | 9/2008 | Buer | H04L 9/085 |
| | | | 713/186 |
| 2019/0116044 A1 | 4/2019 | Matsumoto | |
| 2020/0007338 A1* | 1/2020 | Oh | H04L 9/0866 |

FOREIGN PATENT DOCUMENTS

| | | |
|---|---|---|
| JP | 2008-174095 A | 7/2008 |
| JP | 2019-75721 A | 5/2019 |

OTHER PUBLICATIONS

Dodis, Y. et al., "Fuzzy Extractors: How to Generate Strong Keys from Biometrics and Other Noisy Data", SIAM Journal on Computing, 38(1), Jan. 20, 2008, pp. 97-139.

(Continued)

*Primary Examiner* — Huan V Doan
(74) *Attorney, Agent, or Firm* — GREENBLUM & BERNSTEIN, P.L.C.

(57) ABSTRACT

A system includes: a first authentication unit configured to perform authentication based on biometric information that is information about a body of a first user who reserves a usage target that is a target capable of being used by the user, that is, first authentication for authenticating legitimacy of the first user; and a second authentication unit configured to perform authentication based on the biometric information of a second user who uses the usage target, that is, second authentication for authenticating that the second user is the same as the first user.

17 Claims, 6 Drawing Sheets

(56) References Cited

OTHER PUBLICATIONS

International Search Report issued in International Bureau of WIPO Patent Application No. PCT/JP2021/003574, dated Apr. 20, 2021, along with an English translation thereof.

* cited by examiner

FIG. 3
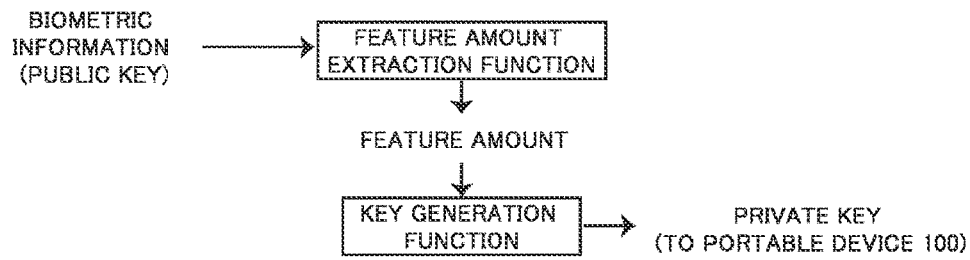
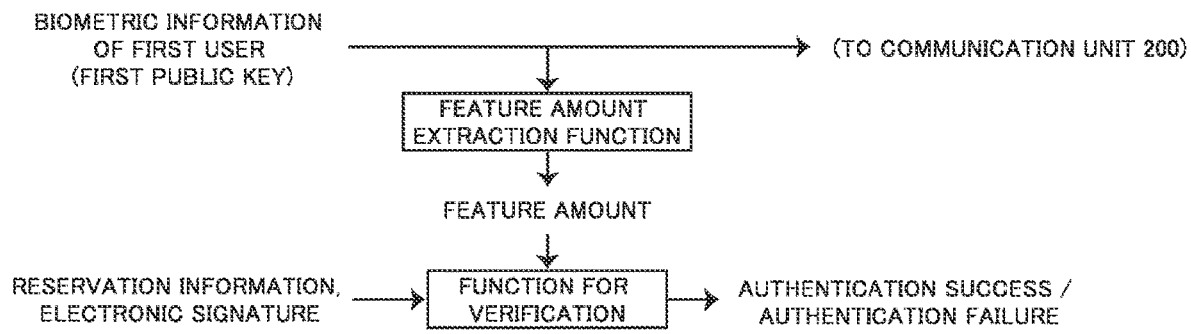
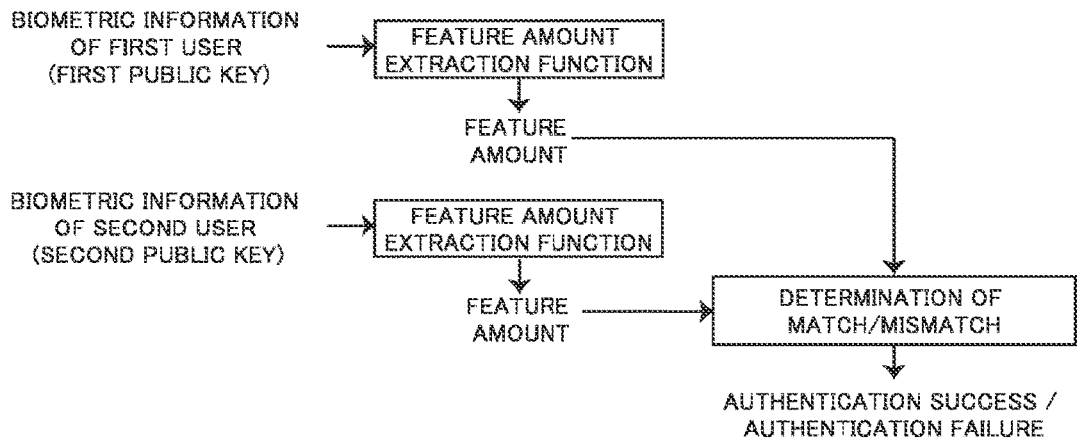

FIG. 4
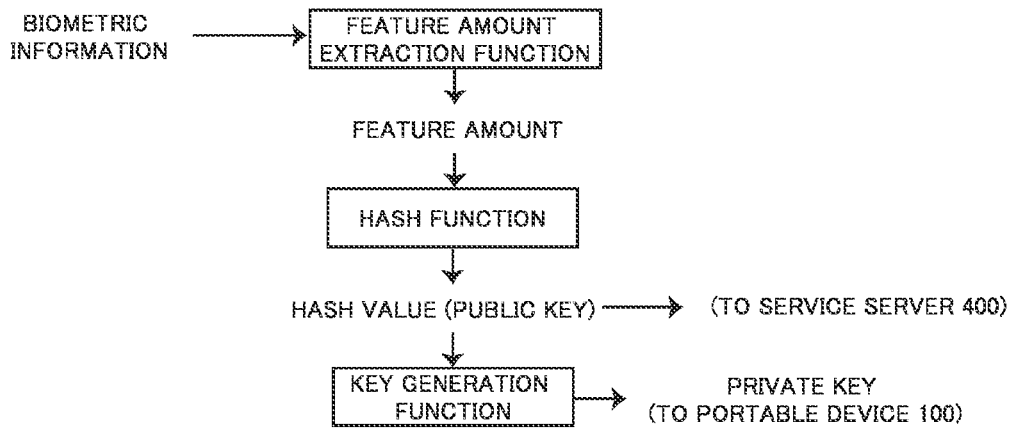
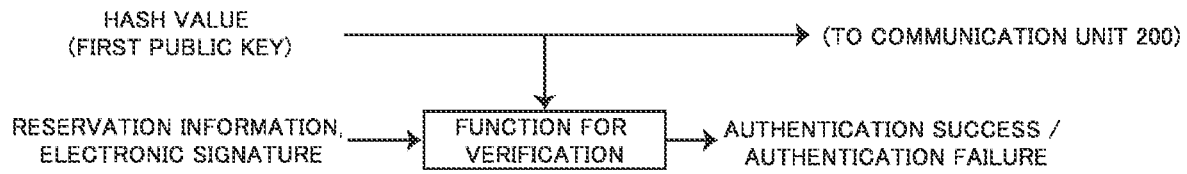
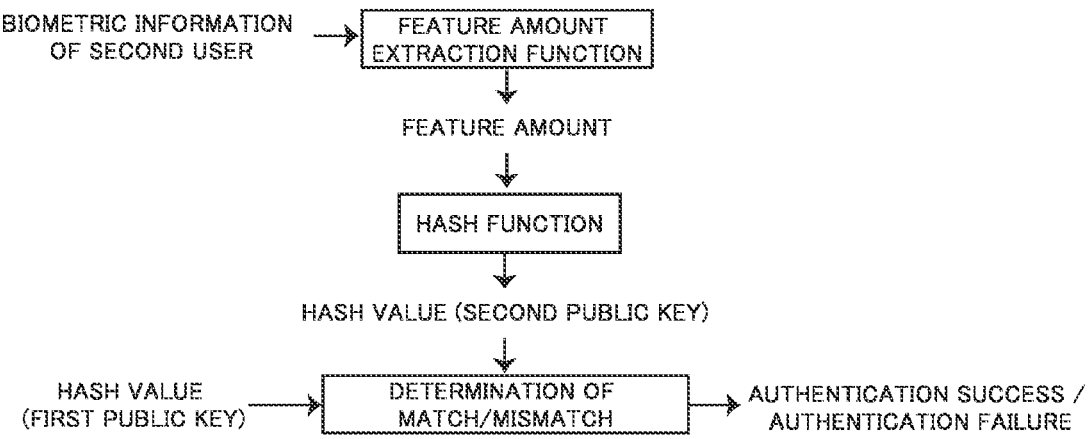

FIG. 5
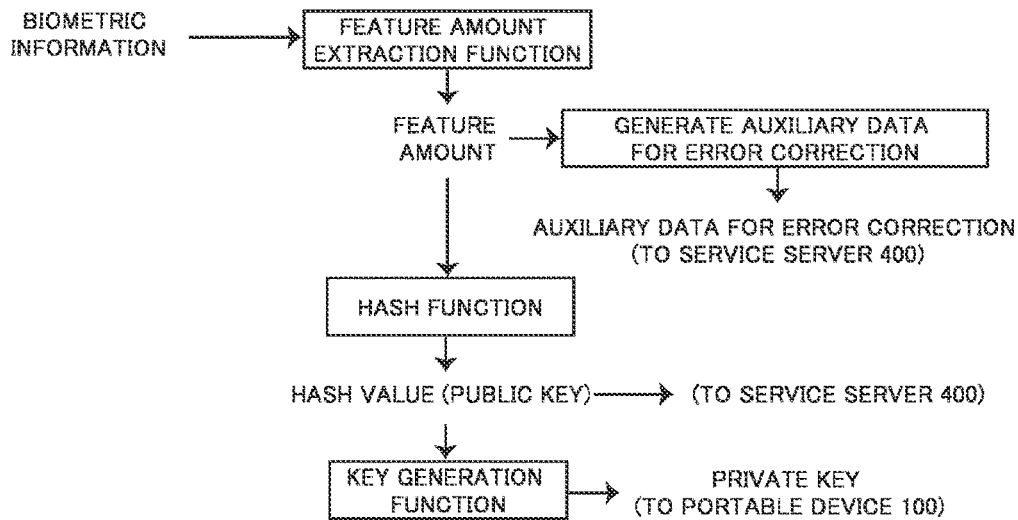
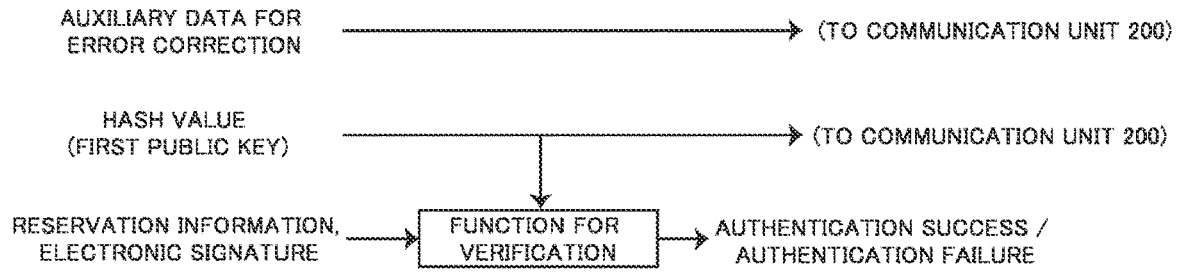
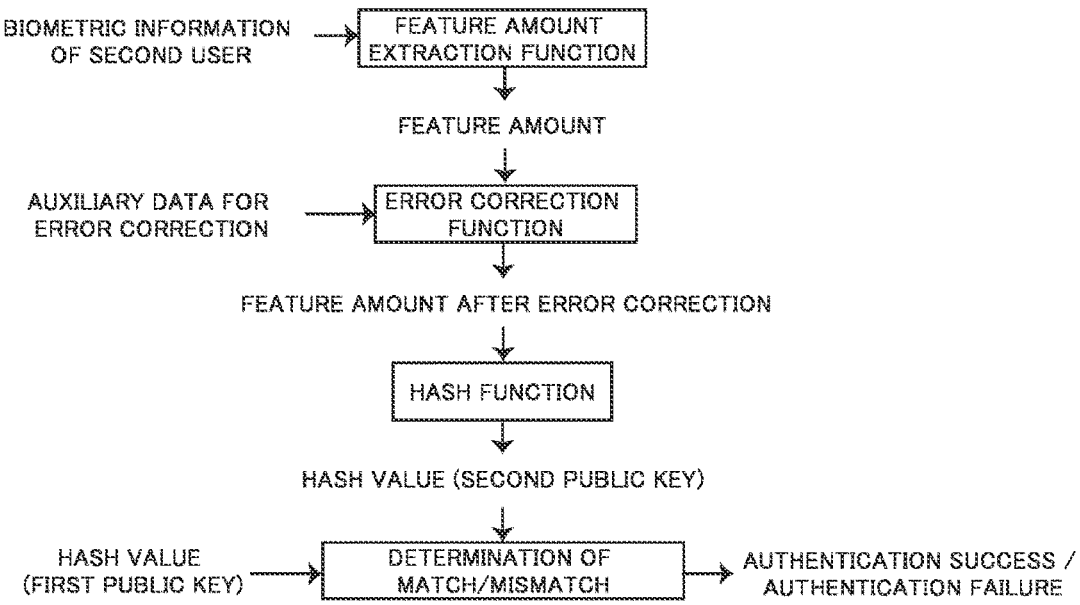

FIG. 6
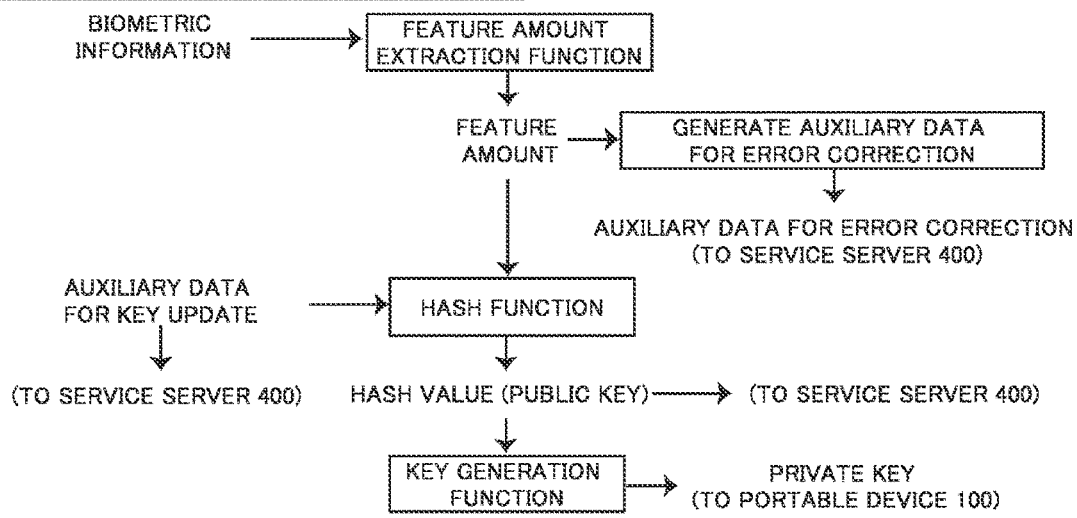
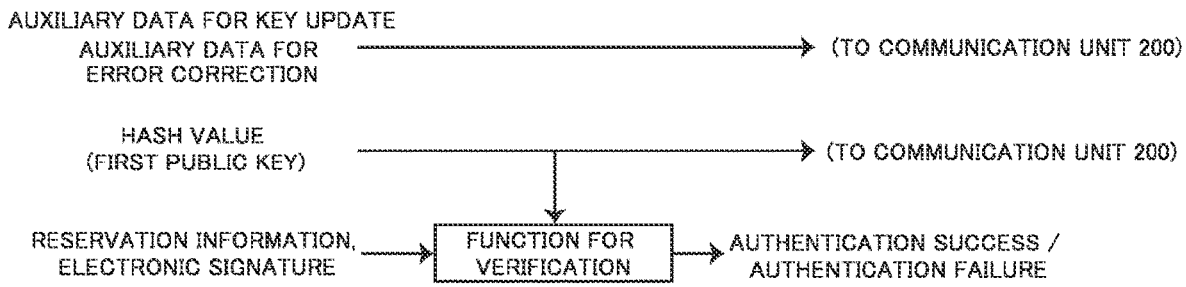
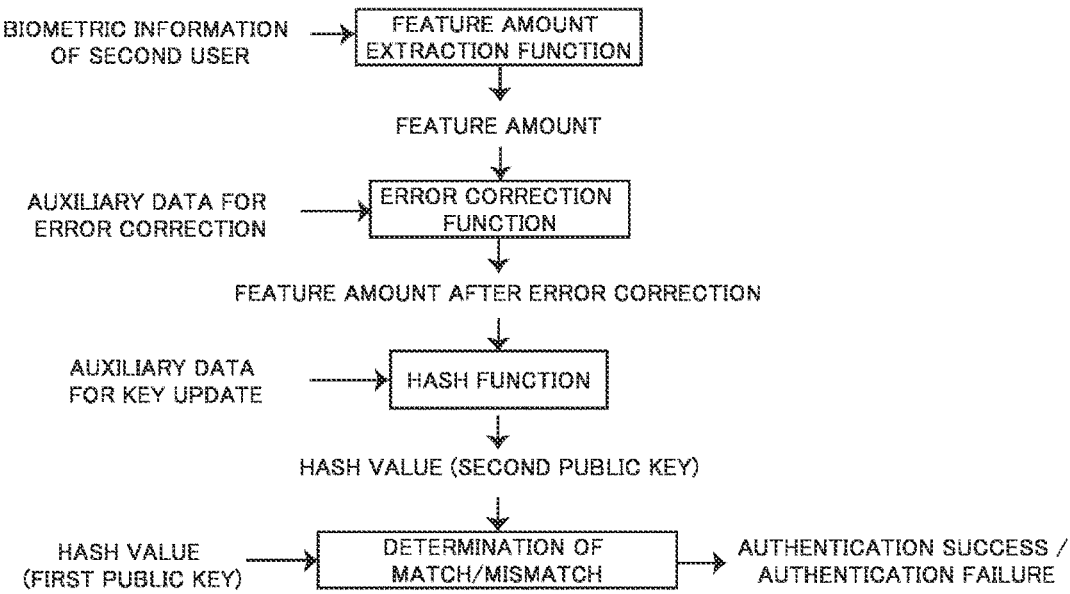

SYSTEM AND AUTHENTICATION DEVICE

TECHNICAL FIELD

The present invention relates to a system and an authentication device.

BACKGROUND ART

In recent years, using biometric information of users for authentication when vehicles are used has been examined. For example, Patent Literature 1 discloses a technique of collating a fingerprint registered in a vehicle in advance with a fingerprint of a user who intends to use the vehicle and determining that authentication is successful to permit use of the vehicle in a case where the two fingerprints match each other.

CITATION LIST

Patent Literature

Patent Literature 1: JP 2008-174095A

SUMMARY OF INVENTION

Technical Problem

However, in Patent Literature 1, so-called car sharing in which one vehicle is shared by a plurality of people has not been examined.

Consequently, the present invention was contrived in view of the above problem, and an object of the present invention is to provide a mechanism that makes it possible to improve security in a use case in which a usage target is shared by a plurality of people.

Solution to Problem

To solve the above described problem, according to an aspect of the present invention, there is provided a system comprising: a first authentication unit configured to perform authentication based on biometric information that is information about a body of a first user who reserves a usage target that is a target capable of being used by the user, that is, first authentication for authenticating legitimacy of the first user; and a second authentication unit configured to perform authentication based on the biometric information of a second user who uses the usage target, that is, second authentication for authenticating that the second user is the same as the first user.

To solve the above described problem, according to another aspect of the present invention, there is provided an authentication device comprising a first authentication unit configured to: perform authentication based on biometric information that is information about a body of a first user who reserves a usage target that is a target capable of being used by the user, that is, first authentication for authenticating legitimacy of the first user; and provide information for second authentication to a second authentication unit configured to perform authentication based on the biometric information of a second user who uses the usage target, that is, the second authentication for authenticating that the second user is the same as the first user.

Advantageous Effects of Invention

According to the present invention as described above, it is possible to provide a mechanism that makes it possible to improve security in a use case in which a usage target is shared by a plurality of people.

BRIEF DESCRIPTION OF DRAWINGS

FIG. 3 is a diagram illustrating processing which is executed by each device in a first example of the present embodiment.

FIG. 4 is a diagram illustrating processing which is executed by each device in a second example of the present embodiment.

FIG. 5 is a diagram illustrating processing which is executed by each device in a third example of the present embodiment.

FIG. 6 is a diagram illustrating processing which is executed by each device in a fourth example of the present embodiment.

DESCRIPTION OF EMBODIMENTS

Figure 1:
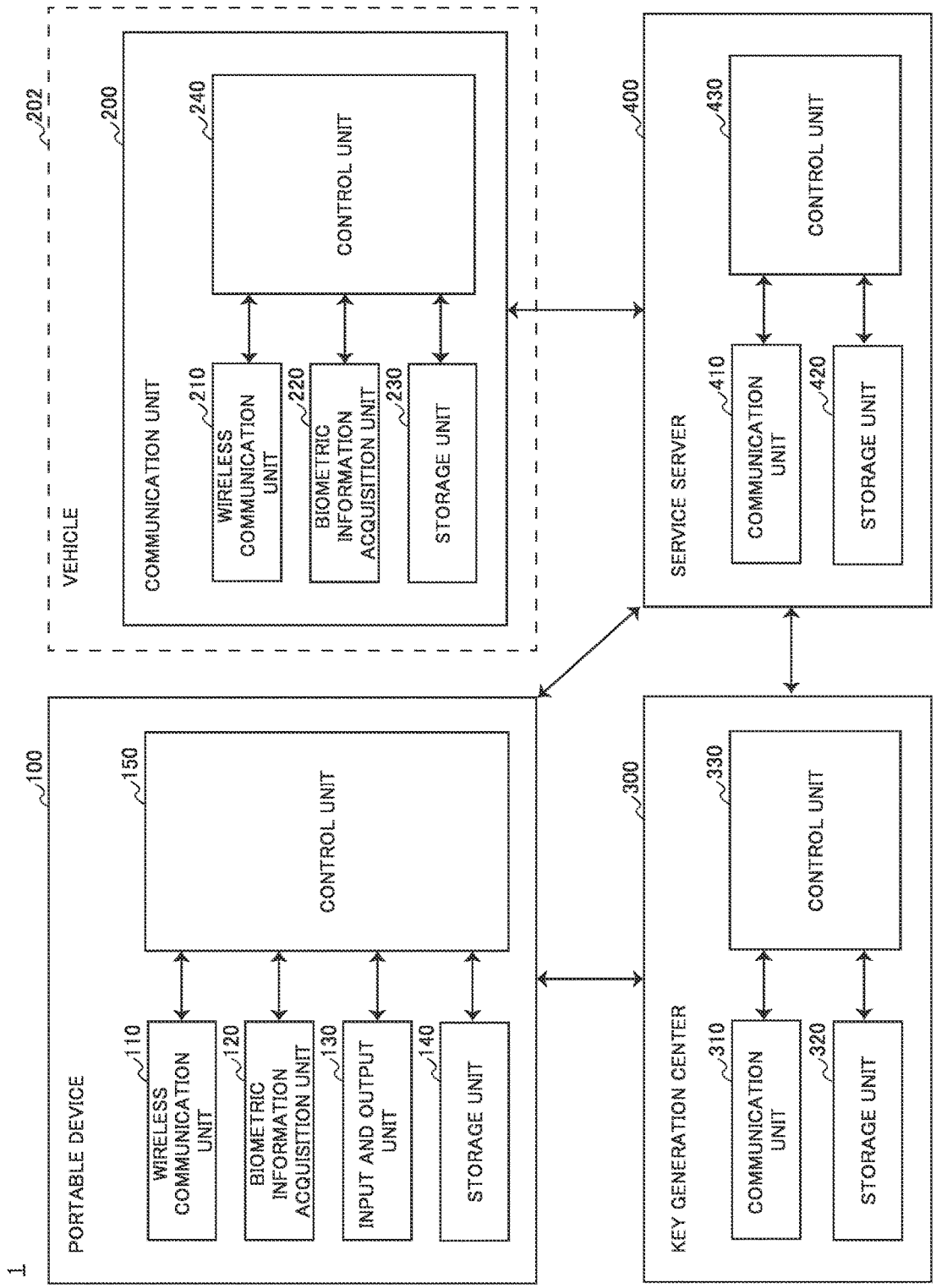
FIG. 1 is a block diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

FIG. 1 is a block diagram illustrating an example of a configuration of a system 1 according to an embodiment of the present invention. As shown in FIG. 1, the system 1 includes a portable device 100, a communication unit 200, a key generation center 300, and a service server 400. The communication unit 200 in the present embodiment is mounted in a vehicle 202. The vehicle 202 is an example of a usage target that is a target capable of being used by a user.

The system 1 provides a car sharing service. A user reserves the use of the vehicle 202 using the portable device 100. The user then uses the reserved vehicle 202 at the reserved time. In particular, the system 1 according to the present embodiment performs authentication at the time of reservation (first authentication to be described later) and authentication at the time of use (second authentication to be described later) on the basis of the user's biometric information. The biometric information is information about the user's body.

Specifically, the key generation center 300 generates a key used in these authentications on the basis of the user's biometric information. The service server 400 then uses the key generated by the key generation center 300 to perform authentication at the time of reservation. When the authentication at the time of reservation is successful, the reservation is accepted. On the other hand, the communication unit 200 performs authentication at the time of use. When the authentication at the time of use is successful, the door lock of the vehicle 202 is unlocked or the engine can be started, and thus the vehicle 202 can be used by the user.

Hereinafter, each component will be described in order.

(1) Portable Device 100

The portable device 100 is configured as any device which is carried and used by a user. Examples of any device include an electronic key, a smartphone, a wearable terminal, and the like. As shown in FIG. 1, the portable device 100 includes a wireless communication unit 110, a biometric information acquisition unit 120, an input and output unit 130, a storage unit 140, and a control unit 150.

The wireless communication unit 110 has a function of performing communication based on a predetermined wireless communication standard. For example, the wireless communication unit 110 performs wireless communication for exchanging information with each of the key generation center 300, and the service server 400. Examples of the predetermined wireless communication standard are cellular communication, Wi-Fi (registered trademark), and Bluetooth Low Energy (BLE (registered trademark)).

The biometric information acquisition unit 120 has a function of acquiring the user's biometric information. As an example, the biometric information acquisition unit 120 may include an image sensor. In that case, the biometric information acquisition unit 120 may acquire the user's face image as biometric information. As another example, the biometric information acquisition unit 120 may include a fingerprint sensor. In that case, the biometric information acquisition unit 120 may acquire the user's fingerprint as biometric information.

The input and output unit 130 has a function of accepting an input of information from the user and outputting the information to the user. As an example, the input and output unit 130 may include a display. In that case, the input and output unit 130 outputs an image. As another example, the input and output unit 130 may have a touch sensor. In that case, the input and output unit 130 accepts a touch operation on the touch sensor.

The storage unit 140 has a function of storing various types of information for the operation of the portable device 100. The storage unit 140 is constituted by, for example, a storage medium such as a flash memory and a processing device that executes recording and reproduction on the storage medium.

The control unit 150 has a function of executing processing in the portable device 100. For example, the control unit 150 controls the wireless communication unit 110 to perform wireless communication with other devices. In addition, the control unit 150 controls the biometric information acquisition unit 120 to acquire the user's biometric information. In addition, the control unit 150 controls the input and output unit 130 to acquire information which is input from the user and output the information to the user. In addition, the control unit 150 reads out the information from the storage unit 140 and writes the information to the storage unit 140. Besides, the control unit 150 performs various types of information processing. The control unit 150 is constituted by an electronic circuit such as, for example, a central processing unit (CPU) and a microprocessor.

(2) Communication Unit 200

The communication unit 200 is provided in association with the vehicle 202. Here, it is assumed that the communication unit 200 is mounted in the vehicle 202 such as the communication unit 200 being installed in the interior of the vehicle 202 or being built into the vehicle 202 as a communication module. As shown in FIG. 1, the communication unit 200 includes a wireless communication unit 210, a biometric information acquisition unit 220, a storage unit 230, and a control unit 240.

The wireless communication unit 210 has a function of performing communication based on a predetermined wireless communication standard. For example, the wireless communication unit 210 performs wireless communication for exchanging information with the service server 400. Examples of the predetermined wireless communication standard are cellular communication, Wi-Fi, and BLE.

The biometric information acquisition unit 220 has a function of acquiring the user's biometric information. As an example, the biometric information acquisition unit 220 may include an image sensor. In that case, the biometric information acquisition unit 220 may acquire the user's face image as biometric information. As another example, the biometric information acquisition unit 220 may include a fingerprint sensor. In that case, the biometric information acquisition unit 220 may acquire the user's fingerprint as biometric information.

The storage unit 230 has a function of storing various types of information for the operation of the communication unit 200. The storage unit 230 is constituted by, for example, a storage medium such as a flash memory and a processing device that executes recording and reproduction on the storage medium.

The control unit 240 has a function of controlling the overall operations of the communication unit 200 and vehicle-mounted instruments mounted in the vehicle 202. As an example, the control unit 240 controls the wireless communication unit 210 to perform wireless communication with other devices. In addition, the control unit 240 controls the biometric information acquisition unit 220 to acquire the user's biometric information. In addition, the control unit 240 reads out the information from the storage unit 230 and writes the information to the storage unit 230. In addition, the control unit 240 also functions as a door lock control unit that controls the door lock of the vehicle 202 and locks and unlocks the door lock. In addition, the control unit 240 also functions as an engine control unit that controls the engine of the vehicle 202 and starts/stops the engine. Meanwhile, a motive power source included in the vehicle 202 may be a motor or the like in addition to the engine. Besides, the control unit 240 performs various types of information processing. The control unit 240 is configured as, for example, an electronic control unit (ECU).

(3) Key Generation Center 300

The key generation center 300 is configured as, for example, a server on the Internet. As shown in FIG. 1, the key generation center 300 includes a communication unit 310, a storage unit 320, and a control unit 330.

The communication unit 310 has a function of performing communication with other devices. For example, the communication unit 310 communicates with each of the portable device 100 and the service server 400 through the Internet.

The storage unit 320 has a function of storing various types of information for the operation of the key generation center 300. The storage unit 320 is constituted by, for example, a storage medium such as a hard disc drive (HDD) and a processing device that executes recording and reproduction on the storage medium.

The control unit 330 has a function of executing processing in the key generation center 300. For example, the control unit 330 controls the communication unit 310 to perform communication with other devices. In addition, the control unit 330 reads out the information from the storage unit 320 and writes the information to the storage unit 320. Besides, the control unit 330 performs various types of information processing. The control unit 330 is constituted by an electronic circuit such as, for example, a central processing unit (CPU) and a microprocessor.

(4) Service Server 400

The service server 400 is configured as, for example, a server on the Internet. As shown in FIG. 1, the service server 400 includes a communication unit 410, a storage unit 420, and a control unit 430.

The communication unit 410 has a function of performing communication with other devices. For example, the communication unit 410 communicates with each of the portable device 100, the communication unit 200, and the key generation center 300 through the Internet.

The storage unit 420 has a function of storing various types of information for the operation of the service server 400. The storage unit 420 is constituted by, for example, a storage medium such as a hard disc drive (HDD) and a processing device that executes recording and reproduction on the storage medium.

The control unit 430 has a function of executing processing in the service server 400. For example, the control unit 430 controls the communication unit 410 to perform communication with other devices. In addition, the control unit 430 reads out the information from the storage unit 420 and writes the information to the storage unit 420. Besides, the control unit 430 performs various types of information processing. The control unit 430 is constituted by an electronic circuit such as, for example, a central processing unit (CPU) and a microprocessor.

2. Technical Feature

2.1. Basic Characteristics

A user who reserves a usage target is also referred to as a first user. In addition, the user who uses the usage target is also referred to as a second user. Unless otherwise mentioned, the user who uses the portable device 100 is assumed to be a first user and a second user.

(1) Registration Process

A registration process is a process of registering that the user is a user of a car sharing service in the system 1. Hereinafter, each process which is executed in the registration process will be described.

The key generation center 300 is an example of a key generation unit in the present invention. That is, the key generation center 300 generates a private key on the basis of a public key corresponding to the user's biometric information. For example, the portable device 100 acquires the user's biometric information and transmits the acquired biometric information to the key generation center 300. The key generation center 300 then generates a private key on the basis of the public key corresponding to the received biometric information.

The public key and the private key are a pair of encryption keys used for encryption and decryption. The public key is a widely disclosed encryption key. The private key is an encryption key of which the disclosure destination is limited. The key generation center 300 issues a private key using a key generation function of an ID-based signature scheme. The ID-based signature scheme is a scheme in which the key generation center 300 issues a private key for signature corresponding to information for identifying each user and secretly distributes the issued private key to each user. The key generation function is a function of outputting a private key corresponding to a public key. In the present embodiment, the key generation center 300 issues a private key corresponding to the user's biometric information.

The key generation center 300 transmits the issued private key to the portable device 100. The portable device 100 then stores the received private key.

The service server 400 stores a public key. The service server 400 may store the public key corresponding to the user's biometric information in association with information on identification of the user.

The public key may be biometric information itself. In that case, the service server 400 may receive the biometric information from the user through the portable device 100, or may acquire the biometric information from the key generation center 300.

The public key may be information which is generated on the basis of biometric information. In that case, the key generation center 300 generates a public key on the basis of the biometric information. The service server 400 may also generate a public key on the basis of the biometric information. In addition, the service server 400 may acquire the public key generated by the key generation center 300.

The first user who is a user who reserves the vehicle 202 is assumed to execute the registration process in advance. Hereinafter, the private key generated on the basis of the public key corresponding to the first user's biometric information is also referred to as a first private key.

(2) Reservation Process

The reservation process is a process of reserving the vehicle 202. Hereinafter, each process which is executed in the reservation process will be described.

The portable device 100 is an example of a reservation unit in the present invention. That is, the portable device 100 performs a reservation for a target to be used by the first user by associating reservation information that is information about the reservation for a target to be used by the first user with an electronic signature generated on the basis of the reservation information and the private key generated by the key generation center 300 and transmitting the reservation information and the associated electronic signature to the service server 400. The reservation information includes, for example, information on identification of the first user who performs a reservation, information for designating the vehicle 202 that is a target for reservation, information indicating a start time of use, information indicating payment in cryptocurrency, and information indicating other requests. The cryptocurrency is a virtual currency by which the safety of transactions is secured on the basis of the theory of cryptography. The electronic signature is information imparted to information on a signature target. A verifier who is a subject who verifies an electronic signature verifies an electronic signature using a public key which is paired with a private key used to generate the electronic signature. In a case where the verification is successful, it is proved that the text to be signed was created by the owner of the private key. On the other hand, in a case where the verification fails, it is proved that the text to be signed was not created by the owner of the private key. That is, the electronic signature is generated on the basis of the private key, and thus it is possible to prove that the reservation information was generated by a registered user. Further, the electronic signature is generated on the basis of the reservation information, it is possible to prove that the reservation information has not been forged or altered. As described above, the electronic signature based on the reservation information and the private key is imparted to the reservation information, and thus it is possible to improve the security at the time of reservation of the vehicle 202.

The service server 400 is an example of a first authentication unit in the present invention. In addition, the service server 400 is an example of an authentication device in the present invention. That is, the service server 400 performs authentication based on the first user's biometric information, that is, first authentication for authenticating the legitimacy of the first user. The authentication based on the first user's biometric information is authentication using a first public key. Authenticating the legitimacy of the first user involves verifying that the first user who reserves the vehicle 202 is a registered user. With such a configuration, it is possible to improve the security at the time of reservation of the vehicle 202 from the viewpoint that a reservation can be made only for a registered user.

Specifically, the service server 400 verifies whether the electronic signature is correct using the first public key that is a public key corresponding to the first user's biometric information. The service server 400 then performs, as the first authentication, determining that the authentication is successful in a case where the electronic signature is verified to be correct and determining that the authentication has failed in a case where the electronic signature is verified to be incorrect. Since the electronic signature is generated on the basis of the first private key, the service server 400 determines that the authentication is successful in a case where the reservation information is generated by a registered user, and determines that the authentication has failed otherwise. In addition, since the electronic signature is generated on the basis of the reservation information, the service server 400 determines that the authentication is successful in a case where the reservation information has not been forged or altered, and determines that the authentication has failed otherwise. In this way, according to such a configuration, it is possible to improve the security at the time of reservation of the vehicle 202.

The service server 400 accepts a reservation in a case where it is determined that the authentication is successful in the first authentication. For example, in a case where it is determined that the authentication is successful, the service server 400 stores the reservation information on condition that payment in cryptocurrency designated in the reservation information has been received.

On the other hand, the service server 400 discards the reservation in a case where it is determined that the authentication has failed in the first authentication. Specifically, the service server 400 discards the reservation information in a case where it is determined that the authentication has failed.

(3) Usage Permission Process

A usage permission process is a process of permitting the use of the vehicle 202. Hereinafter, each process which is executed in the usage permission process will be described.

The communication unit 200 is an example of a second authentication unit in the present invention. That is, the communication unit 200 performs authentication based on the biometric information of the second user, that is, second authentication for authenticating that the second user is the same as the first user. The communication unit 200 permits the use of the vehicle 202 under conditions corresponding to the reservation information in a case where it is determined that the authentication is successful, and prohibits the use of the vehicle 202 in a case where it is determined that the authentication has failed. Permitting the use of the vehicle 202 under conditions corresponding to the reservation information involves, for example, making it possible to unlock the door lock and start the engine in the vehicle 202 designated in the reservation information for a period corresponding to the amount of payment in cryptocurrency from the start time of use designated in the reservation information. Prohibiting the use of the vehicle 202 involves, for example, making it impossible to unlock the door lock and start the engine. With such a configuration, it is possible to improve the security at the time of use of the vehicle 202 from the viewpoint that it is possible to prevent the vehicle 202 from being erroneously used by a third party different from the first user who has performed a reservation.

Specifically, the communication unit 200 performs, as the second authentication, determining whether a first public key that is a public key corresponding to the biometric information of the first user who has succeeded in the first authentication and a second public key that is a public key corresponding to the biometric information of the second user correspond to each other, determining that the authentication is successful in a case where the two public keys correspond to each other, and determining that the authentication has failed in a case where the two public keys do not correspond to each other. For example, the communication unit 200 acquires second biometric information and performs the second authentication on the basis of the second public key corresponding to the acquired second biometric information. An example of the first public key and the second public key corresponding to each other is the first public key and second public key matching each other. An example of the first public key and the second public key corresponding each other is information generated on the basis of the first public key and information generated on the basis of the second public key matching each other. According to such a configuration, since the second authentication is performed on the basis of the biometric information of the second user, the user can use the vehicle 202 without carrying the portable device 100 and without performing an operation such as launching a dedicated application even when carrying the portable device. Moreover, even if the user loses the portable device 100, it is possible to prevent the vehicle 202 reserved by the user from being used by a third party who has illegally acquired the portable device 100.

The service server 400 provides the communication unit 200 with information for the second authentication. An example of the information for the second authentication is the reservation information and the first public key.

(4) Flow of Processing

Figure 2:
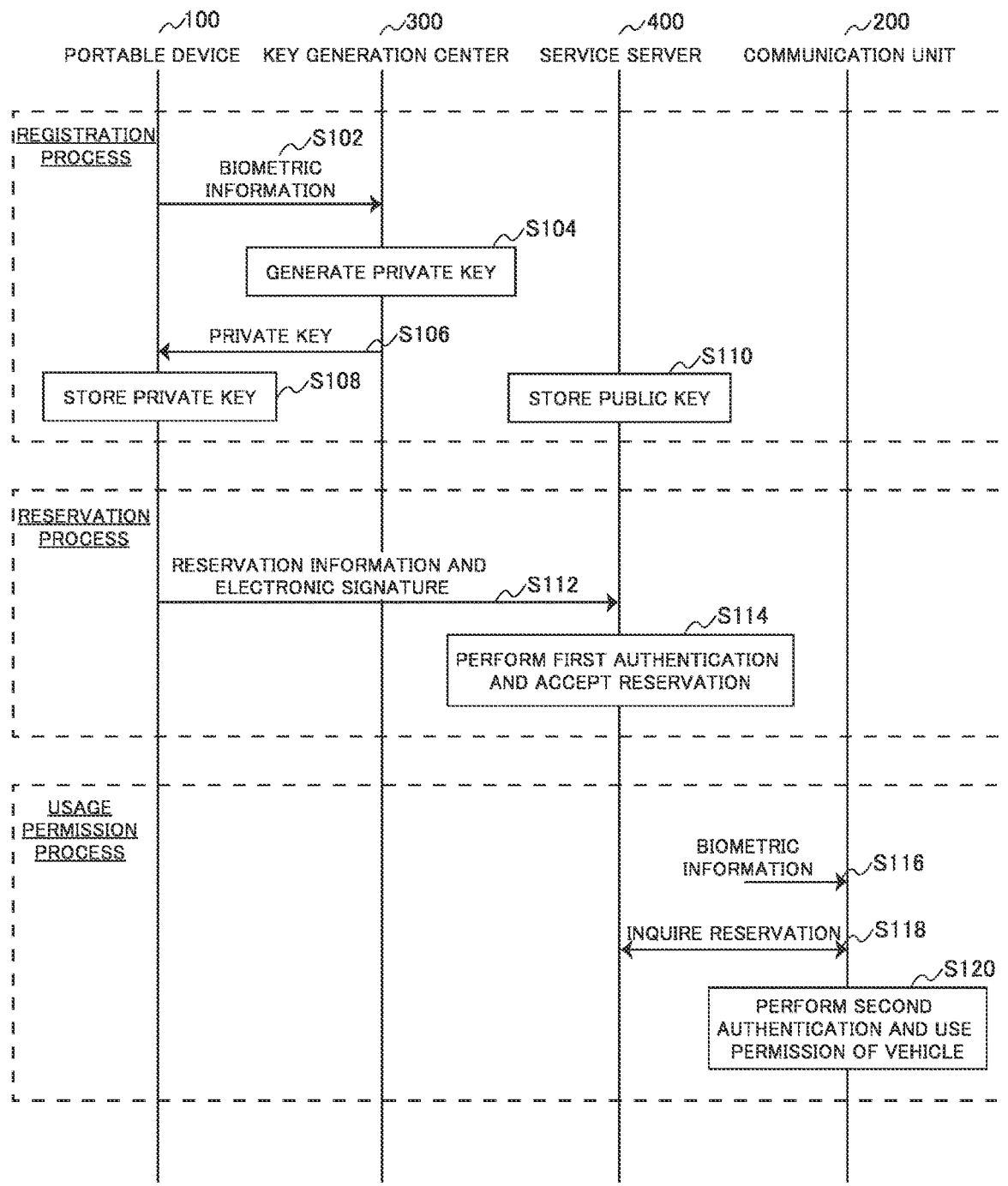
FIG. 2 is a sequence diagram illustrating an example of a flow of processing which is executed in the system according to the present embodiment.

FIG. 2 is a sequence diagram illustrating an example of a flow of processing which is executed in the system 1 according to the present embodiment. The portable device 100, the communication unit 200, the key generation center 300, and the service server 400 are involved in this sequence.

As shown in FIG. 2, first, the system 1 executes the registration process. Hereinafter, a flow of processing included in the registration process will be described.

First, the biometric information acquisition unit 120 of the portable device 100 acquires the biometric information of the user. The wireless communication unit 110 of the portable device 100 then transmits the acquired biometric information to the key generation center 300 (step S102).

When the biometric information is received by the communication unit 310, the control unit 330 of the key generation center 300 generates a private key on the basis of the public key corresponding to the biometric information (step S104).

Next, the communication unit 310 of the key generation center 300 transmits the generated private key to the portable device 100 (step S106). When the private key is received by the wireless communication unit 110, the control unit 150 of the portable device 100 stores the received private key in the storage unit 140 (step S108).

On the other hand, the control unit 430 of the service server 400 stores the public key corresponding to the biometric information of the user in the storage unit 420 (step S110). Meanwhile, the service server 400 may receive the biometric information of the user from the portable device 100 and store the public key corresponding to the received biometric information. In addition, the service server 400 may receive and store the public key corresponding to the biometric information of the user from the key generation center 300.

As shown in FIG. 2, subsequently, the system 1 executes the reservation process. Hereinafter, a flow of processing included in the reservation process will be described.

First, the input and output unit 130 of the portable device 100 accepts an input of the reservation information performed by a user (equivalent to the first user). Next, the control unit 150 of the portable device 100 generates an electronic signature on the basis of the reservation information input by the user and the private key stored in the registration process. The wireless communication unit 110 of the portable device 100 associates the generated electronic signature with the reservation information and transmits it to the service server 400 (step S112).

When the reservation information and the electronic signature are received by the communication unit 410, the control unit 430 of the service server 400 performs the first authentication and accepts a reservation (step S114). Specifically, the control unit 430 of the service server 400 first verifies the electronic signature on the basis of the public key stored in the registration process. The control unit 430 of the service server 400 then determines that the authentication is successful in a case where the verification is successful, and stores the reservation information in the storage unit 420. On the other hand, the control unit 430 of the service server 400 determines that the authentication has failed in a case where the verification fails, and discards the reservation information.

As shown in FIG. 2, subsequently, the system 1 executes the usage permission process. Hereinafter, a flow of processing included in the usage permission process will be described.

First, the biometric information acquisition unit 220 of the communication unit 200 acquires biometric information of a user (equivalent to the second user) (step S116). For example, the user approaches the reserved vehicle 202 and inputs the biometric information to the communication unit 200.

Next, the wireless communication unit 210 of the communication unit 200 inquires of the service server 400 whether a reservation corresponding to the current time has been made, and acquires information for the second authentication (step S118). The reservation corresponding to the current time is a reservation in which the current time is included within a predetermined range from the start time of use designated in the reservation information. An example of the information for the second authentication is the public key of the first user who has performed the reservation corresponding to the current time.

Next, the control unit 240 of the communication unit 200 performs the second authentication and the use permission of the vehicle 202 (step S120). Specifically, the control unit 240 of the communication unit 200 determines whether the first public key and the second public key corresponding to the biometric information of the second user correspond to each other. In a case where the first public key and the second public key correspond to each other, the control unit 240 of the communication unit 200 then determines that the authentication is successful and permits the use of the vehicle 202. On the other hand, in a case where the first public key and the second public key do not correspond to each other, the control unit 240 of the communication unit 200 determines that the authentication has failed and prohibits the use of the vehicle 202.

Hereinbefore, an example of the flow of processing which is executed in the system 1 has been described. Various examples of the system 1 according to the present embodiment will be described below.

2.2. First Example

In a first example, the biometric information of the user is a public key. In particular, the first public key is the biometric information of the first user. In addition, the second public key is the biometric information of the second user. The private key is generated on the basis of the feature amount of the biometric information.

FIG. 3 is a diagram illustrating processing which is executed by each device in the first example of the present embodiment. Hereinafter, the first example will be described with reference to FIG. 3.

In the registration process, as shown in FIG. 3, the key generation center 300 generates a private key on the basis of the feature amount extracted from the biometric information of the user. Specifically, the portable device 100 first transmits the biometric information of the user acquired by the biometric information acquisition unit 120 to the key generation center 300. Next, the key generation center 300 extracts the feature amount by inputting the biometric information of the user into a feature amount extraction function. The feature amount extraction function is a function of outputting the feature amount of the input information. The feature amount is information indicating a feature. The key generation center 300 generates a private key by inputting the extracted feature amount into a key generation function. The key generation function is a function of outputting a private key according to the input information. The biometric information has the possibility of a fluctuation occurring even in a case where it is acquired from the same person. Therefore, according to such a configuration, the private key is generated on the basis of the feature amount of the biometric information, and thus it is possible to prevent the authentication from failing due to the fluctuation. The key generation center 300 transmits the generated private key to the portable device 100.

In the reservation process, as shown in FIG. 3, the service server 400 performs, as the first authentication, verifying whether the electronic signature is correct on the basis of the feature amount extracted from the biometric information of the first user. Specifically, the service server 400 extracts the feature amount by inputting the biometric information of the first user that is the first public key stored in the registration process into the feature amount extraction function. Next, the service server 400 determines the success or failure of the authentication by inputting the reservation information, the electronic signature, and the feature amount extracted from the biometric information of the first user into a function for verification. The function for verification is a function of outputting the authentication success in a case where the input reservation information has not been forged or altered and the public key (the feature amount of the biometric information in the present example) input for verification of the electronic signature corresponds to the private key used to generate the electronic signature, and determining that the authentication has failed otherwise. The biometric information has the possibility of a fluctuation occurring even in a case where it is acquired from the same person. Therefore, according to such a configuration, the electronic signature is verified on the basis of the feature amount of the biometric information, and thus it is possible to prevent the authentication from failing due to the fluctuation. Meanwhile, the service server 400 transmits the biometric information of the first user that is the first public key to the communication unit 200 in the later usage permission process.

In the usage permission process, as shown in FIG. 3, the communication unit 200 performs, as the second authentication, determining whether the feature amount extracted from the biometric information of the first user and the feature amount extracted from the biometric information of the second user match each other, determining that the authentication is successful in a case where the two feature amounts match each other, and determining that the authentication has failed in a case where the feature amounts do not match each other. Specifically, the communication unit 200 extracts the feature amount by inputting the biometric information of the first user (equivalent to the first public key) acquired from the service server 400 into the feature amount extraction function. In addition, the communication unit 200 extracts the feature amount by inputting the biometric information of the second user (equivalent to the second public key) acquired by the biometric information acquisition unit 220 into the feature amount extraction function. The communication unit 200 determines the success or failure of the authentication according to whether these extracted feature amounts match each other. The biometric information has the possibility of a fluctuation occurring even in a case where it is acquired from the same person. Therefore, according to such a configuration, the success or failure of the authentication is determined according to match/mismatch between the feature amounts of the biometric information, and thus it is possible to prevent the authentication from failing due to the fluctuation.

2.3. Second Example

In a second example, a public key is generated on the basis of the biometric information of the user.

FIG. 4 is a diagram illustrating processing which is executed by each device in a second example of the present embodiment. Hereinafter, the second example will be described with reference to FIG. 4.

In the registration process, as shown in FIG. 4, the key generation center 300 generates a public key on the basis of the biometric information of the user. Specifically, the key generation center 300 first extracts the feature amount by inputting the biometric information of the user into the feature amount extraction function. Next, the key generation center 300 generates a hash value obtained by inputting the feature amount extracted from the biometric information of the user into a hash function as a public key. The key generation center 300 then transmits the generated hash value as the public key to the service server 400. Meanwhile, the hash function is a function of outputting information different from the input information in accordance with the input information. Typically, the hash function outputs information with a bit length shorter than the bit length of the input information. The hash value is information which is output from the hash function. As the hash function, it is preferable to adopt a function such as SHA-256 which is difficult to perform inverse calculation. The inverse calculation is to calculate the input information from the output information. According to such a configuration, the hash value serves as a public key, and thus it is possible to prevent the biometric information itself from being widely disclosed as the public key and to keep the biometric information confidential.

In addition, the key generation center 300 generates a private key by inputting the hash value into the key generation function. The key generation center 300 then transmits the generated private key to the portable device 100.

In the reservation process, as shown in FIG. 4, the service server 400 performs, as the first authentication, verifying whether the electronic signature is correct using the first public key generated by the key generation center 300. Specifically, the service server 400 determines the success or failure of the authentication by inputting the reservation information, the electronic signature, and the hash value having the feature amount of the biometric information of the first user which is the first public key acquired from the key generation center 300 in the registration process into the function for verification. According to such a configuration, the electronic signature is verified using the hash value as the public key, and thus it is possible to prevent the biometric information itself from being widely disclosed as the public key and to keep the biometric information confidential. Meanwhile, the service server 400 transmits the hash value of the biometric information of the first user that is the first public key to the communication unit 200 in the later usage permission process.

In the usage permission process, as shown in FIG. 4, the communication unit 200 performs, as the second authentication, determining whether the first public key generated by the key generation center 300 and the second public key that is a hash value obtained by inputting the feature amount extracted from the biometric information of the second user into the hash function match each other, determining that the authentication is successful in a case where the two public keys match each other, and determining that the authentication has failed in a case where the two public keys do not match each other. Specifically, the communication unit 200 first extracts the feature amount by inputting the biometric information of the second user acquired by the biometric information acquisition unit 220 into the feature amount extraction function. Next, the communication unit 200 generates a hash value obtained by inputting the feature amount extracted from the biometric information of the second user into the hash function as the second public key. The communication unit 200 then determines the success or failure of the authentication according to whether the hash value that is the first public key acquired from the service server 400 and the hash value that is the generated second public key match each other. According to such a configuration, the success or failure of the authentication is determined using the hash value as the public key, and thus it is possible to prevent the biometric information itself from being widely disclosed as the public key and to keep the biometric information confidential.

2.4. Third Example

In a third example, the public key is generated on the basis of the biometric information of the user. In particular, in the third example, a fluctuation in the biometric information is corrected when the public key is generated.

FIG. 5 is a diagram illustrating processing which is executed by each device in the third example of the present embodiment. Hereinafter, the third example will be described with reference to FIG. 5.

In the registration process, as shown in FIG. 5, the key generation center 300 extracts a feature amount, generates a hash value as a public key, transmits the hash value to the service server 400, generates a private key, and transmits the private key to the portable device 100. These processes are the same as the processes in second example described with reference to FIG. 4.

In the present example, the key generation center 300 further generates auxiliary data for error correction on the basis of the feature amount extracted from the biometric information of the user. The auxiliary data for error correction is information for correcting a fluctuation in the biometric information. The auxiliary data for error correction may be generated by a fuzzy extractor as an example. According to the fuzzy extractor, the same output can be obtained from similar inputs. That is, the same output can be obtained from a plurality of pieces of biometric information which are acquired from the same user but are strictly different from each other due to the fluctuation. The key generation center 300 transmits the generated auxiliary data for error correction to the service server 400.

Meanwhile, a detailed technique related to the fuzzy extractor is disclosed in, for example, Non-Patent Literature "Yevgeniy Dodis, Rafail Ostrovsky, Leonid Reyzin, and Adam Smith. Fuzzy extractors: How to generate strong keys from biometrics and other noisy data. SIAM Journal on Computing, 38(1):97-139, 2008." This Non-Patent Literature discloses a technique for converting noisy information into key information that can be used in an encryption application. Particularly, it is pointed out that the fuzzy extractor has a characteristic of outputting random output information with respect to the input information and a characteristic of outputting the same output information in a case where input information different from each other but close to each other is input. From these characteristics, it is pointed out that the output information obtained by inputting the biometric information into the fuzzy extractor can be used safely as key information.

In the reservation process, as shown in FIG. 5, the service server 400 determines the success or failure of the authentication by inputting the reservation information, the electronic signature, and the hash value that is the first public key acquired from the key generation center 300 in the registration process into the function for verification. In addition, the service server 400 transmits the hash value of the biometric information of the first user that is the first public key to the communication unit 200 in the later usage permission process. These processes are the same as the processes in the second example described with reference to FIG. 4.

In the present example, the service server 400 further transmits the auxiliary data for error correction acquired from the key generation center 300 to the communication unit 200 in the later usage permission process.

In the usage permission process, as shown in FIG. 5, the communication unit 200 corrects the feature amount extracted from the biometric information of the second user on the basis of the auxiliary data for error correction generated by the key generation center 300. Specifically, the communication unit 200 first extracts the feature amount by inputting the biometric information of the second user acquired by the biometric information acquisition unit 220 into the feature amount extraction function. Next, the communication unit 200 generates the feature amount after error correction by inputting the feature amount extracted from the biometric information of the second user and the auxiliary data for error correction acquired from the service server 400 into the error correction function. The error correction function is a function of correcting the information that is a target for error correction in accordance with the auxiliary data for error correction.

The communication unit 200 performs, as the second authentication, determining whether the first public key and the second public key match each other using the hash value obtained by inputting the corrected feature amount into the hash function as the second public key, determining that the authentication is successful in a case where the two public keys match each other, and determining that the authentication has failed in a case where the two public keys do not match each other. Specifically, the communication unit 200 generates a hash value obtained by inputting the feature amount after error correction into the hash function as the second public key. The communication unit 200 then determines the success or failure of the authentication according to whether the hash value that is the first public key acquired from the service server 400 and the hash value serving as the second public key match each other.

Hereinbefore, the present example has been described. According to the present example, the auxiliary data for error correction makes it possible to further prevent the authentication from failing due to a fluctuation in the biometric information.

2.5. Fourth Example

In a fourth example, a public key is generated on the basis of the biometric information of the user. In particular, in the fourth example, an updatable public key is generated. In addition, in the fourth example, similarly to the third example, error correction using the auxiliary data for error correction for correcting a fluctuation in the biometric information is performed.

FIG. 6 is a diagram illustrating processing which is executed by each device in the fourth example of the present embodiment. Hereinafter, the fourth example will be described with reference to FIG. 6.

In the registration process, as shown in FIG. 6, the key generation center 300 generates a hash value obtained by inputting the feature amount extracted from the biometric information of the first user and the auxiliary data for key update into the hash function as the first public key. The auxiliary data for key update is information changing each time the public key is newly generated. An example of the auxiliary data for key update is a random number. Specifically, the key generation center 300 first extracts the feature amount by inputting the biometric information of the user into the feature amount extraction function. Next, the key generation center 300 generates a hash value obtained by inputting the feature amount extracted from the biometric information of the user and the auxiliary data for key update into the hash function as the public key. For example, the key generation center 300 generates a hash value serving as the public key by inputting a feature amount connected to the auxiliary data for key update into the hash function. The key generation center 300 then transmits the generated hash value serving as the public key to the service server 400.

In addition, the key generation center 300 transmits the auxiliary data for key update used to generate the public key to the service server 400.

In addition, the key generation center 300 generates a private key by inputting the hash value into the key generation function. The key generation center 300 then transmits the generated private key to the portable device 100.

In addition, the key generation center 300 generates auxiliary data for error correction on the basis of the feature amount extracted from the biometric information of the user. The key generation center 300 then transmits the generated auxiliary data for error correction to the service server 400.

In the reservation process, as shown in FIG. 5, the service server 400 determines the success or failure of the authentication by inputting the reservation information, the electronic signature, and the hash value that is the first public key acquired from the key generation center 300 in the registration process into the function for verification. In addition, the service server 400 transmits the hash value of biometric information of the first user that is the first public key and the auxiliary data for error correction acquired from the key generation center 300 to the communication unit 200 in the later usage permission process. These processes are the same as the processes in the third example described with reference to FIG. 5.

In the present example, the service server 400 further transmits the auxiliary data for key update acquired from the key generation center 300 to the communication unit 200 in the later usage permission process.

In the usage permission process, as shown in FIG. 6, the communication unit 200 performs, as the second authentication, determining whether the first public key and the second public key match each other using the hash value obtained by inputting the feature amount extracted from the biometric information of the second user and the auxiliary data for key update into the hash function as the second public key, determining that the authentication is successful in a case where the two public keys match each other, and determining that the authentication has failed the two public keys do not match each other. Specifically, the communication unit 200 first extracts the feature amount by inputting the biometric information of the second user acquired by the biometric information acquisition unit 220 into the feature amount extraction function. Next, the communication unit 200 generates the feature amount after error correction by inputting the feature amount extracted from the biometric information of the second user and the auxiliary data for error correction acquired from the service server 400 into the error correction function. Next, the communication unit 200 generates a hash value obtained by inputting the corrected feature amount and the auxiliary data for key update acquired from the service server 400 into the hash function as the second public key. The communication unit 200 then determines the success or failure of the authentication according to whether the hash value that is the first public key acquired from the service server 400 and the hash value serving as the second public key match each other.

In a case where the private key is leaked to a third party other than the portable device 100, the third party may impersonate the user, that is, perform a reservation for the vehicle 202 using the leaked private key.

Consequently, in a case where the leakage of the private key is suspected, the key generation center 300 updates the public key and the private key. Specifically, the key generation center 300 newly generates a hash value serving as the public key using auxiliary data for key update different from the auxiliary data for key update used to generate the private key in the past. The key generation center 300 then newly generates a private key on the basis of the newly generated hash value serving as the public key.

In a case where the private key is newly generated, the key generation center 300 transmits the newly generated private key to the portable device 100. In the reservation process, the portable device 100 generates an electronic signature using the newly generated private key. On the other hand, in a case where the public key is newly generated, the key generation center 300 associates the newly generated public key with information indicating that it is valid, and associates the public key generated in the past with information indicating that it is invalid. The associated information is disclosed (that is, transmitted) to the service server 400. When the first user performs the reservation process, the service server 400 performs the first authentication using the first public key with which information indicating that it is valid is associated. In that case, the service server 400 determines that the authentication is successful for the electronic signature with which information indicating that it is valid is associated, that is, which is generated on the basis of the newly generated private key. On the other hand, the service server 400 determines that the authentication has failed for the electronic signature with which information indicating that it is invalid is associated, that is, which is generated on the basis of the private key generated in the past. Therefore, a reservation performed using an invalid private key can be eliminated with high reliability. That is, it is possible to prevent a third party who has illegally acquired the private key generated in the past from impersonating the user.

In a case where the public key is newly generated, the key generation center 300 may associate information indicating a valid period with each of the newly generated public key and the public key generated in the past. An example of the beginning of the valid period of a public key is a time at which the public key is generated. An example of the end of the valid period of a public key is a time at which the leakage of the public key is suspected. The associated information is disclosed (that is, transmitted) to the service server 400.

On the other hand, the service server 400 determines that the authentication has failed for the first authentication performed using the first public key that does not include a time associated with the reservation information in the valid period. The service server 400 then discards the reservation for which it is determined that the authentication has failed. In other words, the service server 400 maintains the authentication success for the first authentication performed using the first public key that includes the time associated with the reservation information in the valid period. An example of the time associated with the reservation information is a time at which the reservation information and the electronic signature are received. Hereinafter, such a time is also referred to as a reservation application time. According to such a configuration, it is possible to keep a reservation valid which is made at a timing before the leakage is suspected while invalidating a reservation made at a timing after the leakage is suspected. Therefore, it is possible to eliminate the time and effort of making a re-reservation concomitant with the invalidation of the key while improving the security.

Here, the first authentication unit may be constituted by a block chain. The block chain is a technique of generating data in units called blocks and managing data by linking the blocks. The newly generated block is linked to the previously generated block. Therefore, the blocks will increase in order. The block chain is used in various techniques such as virtual currency as technology of recording and publishing all the change histories of past data. In the block chain, an entity that makes various determinations on data contained in a block is also referred to as a smart contract.

The key generation center 300 may write the generated public key to a block in the block chain. The smart contract serving as the first authentication unit performs the first authentication using the public key written in the block. According to such a configuration, it is possible to more easily implement the publication of the public key and the first authentication using the public key.

In particular, the smart contract serving as the first authentication unit may recognize the valid period of the public key on the basis of a time at which the public key is written in a block. In a case where a certain user's private key is suspected of being leaked, the key generation center 300 reissues the public key and the private key, and writes the newly issued public key in a block next to the block written in the previously issued public key. Thus, the valid period of a certain public key is from a time at which the public key is written in a block to a time at which the next issued public key is written in the next block. The smart contract determines that the authentication has failed for the first authentication performed using the first public key that does not include the reservation application time in the valid period. On the other hand, the smart contract maintains the authentication success for the first authentication performed using the first public key that includes the reservation application time in the valid period. According to such a configuration, the time written in a block indicates the valid period of each public key, and thus it is possible to facilitate the implementation in that the valid period does not need to be managed separately.

In addition, the portable device 100 may write the reservation information and the electronic signature in a block in the block chain. The smart contract serving as the first authentication unit then performs the first authentication on the reservation information and the electronic signature which are written in the block. Meanwhile, the block chain in which the reservation information and the electronic signature are written and the block chain in which the public key is written may be configured separately.

The smart contract serving as the first authentication unit determines that the authentication has failed for the first authentication performed using the first public key that does not include a time at which the reservation information and the electronic signature are written in a block in the valid period. In addition, the smart contract maintains the authentication success for the first authentication performed using the first public key that includes the time at which the reservation information and the electronic signature are written in a block in the valid period. According to such a configuration, the time at which the reservation information and the electronic signature are written in a block can be treated as the reservation application time, and thus it is possible to facilitate the implementation in that the reservation application time does not need to be managed separately.

3. Conclusion

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the above embodiment, although an example in which the usage target is the vehicle 202 has been described, the present invention is not limited to such an example. The usage target may be mounted in any moving objects such as an airplane and a ship other than a vehicle. Here, the moving object is a moving device. Naturally, the usage target is not limited to the moving object. The usage target may be a house, a hotel room, or the like, and, for example, locking/unlocking on a door may be executed on the basis of the authentication result.

For example, although an example in which the portable device 100 has the biometric information acquisition unit 120 has been described above, the present invention is not limited to such an example. For example, the portable device 100 may not have the biometric information acquisition unit 120. In that case, in the registration process, the biometric information of the user may be acquired at an actual store and transmitted to the key generation center 300.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using the flowcharts and the sequence diagrams are not necessarily executed in the order illustrated in the drawings. Some processing steps may be executed in parallel. In addition, additional processing steps may be employed and some processing steps may be omitted.

REFERENCE SIGNS LIST

1 system
100 portable device
110 wireless communication unit
120 biometric information acquisition unit
130 input and output unit
140 storage unit
150 control unit
200 communication unit
210 wireless communication unit
220 biometric information acquisition unit
230 storage unit
240 control unit
300 key generation center
310 communication unit
320 storage unit
330 control unit
400 service server
410 communication unit
420 storage unit
430 control unit

The invention claimed is:
1. A system comprising:
a memory;
a first authentication processor configured to perform authentication based on biometric information that is information about a body of a first user who reserves a usage target that is a target capable of being used by the user, that is, first authentication for authenticating legitimacy of the first user;
a second authentication processor configured to perform authentication based on the biometric information of a second user who uses the usage target, that is, second authentication for authenticating that the second user is the same as the first user;

a key generation processor configured to generate a private key on the basis of a first public key that is a public key corresponding to the biometric information of the first user; and a reservation processor configured to perform a reservation for the target to be used by the first user by transmitting reservation information and an electronic signature associated with the reservation information to the first authentication processor, the reservation information being information about a reservation for the target to be used by the first user, the electronic signature being generated on the basis of the reservation information and the private key generated by the key generation processor.

2. The system according to claim 1, wherein the first authentication processor performs, as the first authentication, verifying whether the electronic signature is correct using a first public key that is a public key corresponding to the biometric information of the first user, determining that the authentication is successful in a case where the electronic signature is verified to be correct, and determining that the authentication has failed in a case where the electronic signature is verified to be incorrect.

3. The system according to claim 2, wherein the second authentication processor performs, as the second authentication, determining whether a first public key that is a public key corresponding to the biometric information of the first user who has succeeded in the first authentication and a second public key that is a public key corresponding to the biometric information of the second user correspond to each other, determining that the authentication is successful in a case where the public keys correspond to each other, and determining that the authentication has failed in a case where the public keys do not correspond to each other.

4. The system according to claim 3, wherein the first public key is the biometric information of the first user, and
the key generation processor generates the private key on the basis of a feature amount extracted from the biometric information of the first user.

5. The system according to claim 3, wherein the first public key is the biometric information of the first user, and
the first authentication processor performs, as the first authentication, verifying whether the electronic signature is correct on the basis of a feature amount extracted from the biometric information of the first user.

6. The system according to claim 3, wherein the first public key is the biometric information of the first user,
the second public key is the biometric information of the second user, and
the second authentication processor performs, as the second authentication, determining whether a feature amount extracted from the biometric information of the first user and a feature amount extracted from the biometric information of the second user match each other, determining that the authentication is successful in a case where the two feature amounts match each other, and determining that the authentication has failed in a case where the two feature amounts do not match each other.

7. The system according to claim 3, wherein the key generation processor generates the first public key on the basis of the biometric information of the first user and transmits the generated first public key to the first authentication processor.

8. The system according to claim 7, wherein the key generation processor generates, as the first public key, a hash value obtained by inputting a feature amount extracted from the biometric information of the first user into a hash function.

9. The system according to claim 8, wherein the first authentication processor performs, as the first authentication, verifying whether the electronic signature is correct using the first public key generated by the key generation processor.

10. The system according to claim 8, wherein the second authentication processor performs, as the second authentication, determining whether the first public key generated by the key generation processor and the second public key that is a hash value obtained by inputting a feature amount extracted from the biometric information of the second user into a hash function match each other, determining that the authentication is successful in a case where the two public keys match each other, and determining that the authentication has failed in a case where the two public keys do not match each other.

11. The system according to claim 10, wherein the key generation processor generates auxiliary data for error correction that is information for correcting a fluctuation in the biometric information on the basis of a feature amount extracted from the biometric information of the first user, and
the second authentication processor
corrects the feature amount extracted from the biometric information of the second user on the basis of the auxiliary data for error correction generated by the key generation processor, and
performs, as the second authentication, determining whether the first public key and the second public key match each other using a hash value obtained by inputting the corrected feature amount into the hash function as the second public key, determining that the authentication is successful in a case where the two public keys match each other, and determining that the authentication has failed in a case where the two public keys do not match each other.

12. The system according to claim 10, wherein the key generation processor generates, as the first public key, a hash value obtained by inputting a feature amount extracted from the biometric information of the first user and auxiliary data for key update that is information changing each time the first public key is newly generated into a hash function, and
the second authentication processor performs, as the second authentication, determining whether the first public key and the second public key match each other using a hash value obtained by inputting the feature amount extracted from the biometric information of the second user and the auxiliary data for key update into a hash function as the second public key, determining that the authentication is successful in a case where the two public keys match each other, and determining that the authentication has failed in a case where the two public keys do not match each other.

13. The system according to claim 12, wherein, in a case where the first public key is newly generated, the key generation processor associates the newly generated first public key with information indicating that it is valid and associates the first public key generated in the past with information indicating that it is invalid, and
the first authentication processor performs the first authentication using the first public key with which information indicating that it is valid is associated.

14. The system according to claim 13, wherein, in a case where the first public key is newly generated, the key generation processor associates information indicating a valid period with each of the newly generated first public key and the first public key generated in the past, and the first authentication processor determines that the authentication has failed for the first authentication performed using the first public key that does not include a time associated with the reservation information in the valid period.

15. The system according to claim 14, wherein the reservation processor writes the reservation information and the electronic signature to a block in a block chain, and the first authentication processor determines that the authentication has failed for the first authentication performed using the first public key that does not include a time at which the reservation information and the electronic signature are written to the block in the valid period.

16. The system according to claim 13, wherein the key generation processor writes the generated first public key to a block in a block chain, and the first authentication processor recognizes a valid period of the first public key on the basis of a time at which the first public key is written to the block and determines that the authentication has failed for the first authentication performed using the first public key that does not include a time associated with the reservation information in the valid period.

17. An authentication device comprising a memory and a first authentication processor configured to:

perform authentication based on biometric information that is information about a body of a first user who reserves a usage target that is a target capable of being used by the user, that is, first authentication for authenticating legitimacy of the first user;

provide information for second authentication to a second authentication processor configured to perform authentication based on the biometric information of a second user who uses the usage target, that is, the second authentication for authenticating that the second user is the same as the first user;

provide a private key that is generated by a key generation processor on the basis of a first public key that is a public key corresponding to the biometric information of the first user; and provide a reservation for the target to be used by the first user by transmitting reservation information and an electronic signature associated with the reservation information, the reservation information being information about a reservation for the target to be used by the first user, the electronic signature being generated on the basis of the reservation information and the private key generated by the key generation processor.

* * * * *